United States Patent [19]

Ahlquist et al.

[11] 4,088,411

[45] May 9, 1978

[54] LENGTH MEASUREMENT APPARATUS FOR CONTINUOUSLY ADVANCING ARTICLES

[75] Inventors: Gary W. Ahlquist, Webster; Michael K. Milley, Rochester, both of N.Y.

[73] Assignee: Eastman Kodak Company, Rochester, N.Y.

[21] Appl. No.: 681,365

[22] Filed: Apr. 29, 1976

[51] Int. Cl.$^2$ ............................................. G01B 11/04
[52] U.S. Cl. ..................................... 356/167; 250/560
[58] Field of Search ............................... 356/157–160, 356/167, 199; 250/223 R, 224, 560

[56] References Cited

U.S. PATENT DOCUMENTS

| | | | |
|---|---|---|---|
| 2,730,006 | 1/1956 | Gottschall | 250/560 |
| 3,060,791 | 10/1962 | Tarczy-Hornock | 250/223 R |
| 3,365,699 | 1/1968 | Foster | 250/223 R |
| 3,710,128 | 1/1973 | Kubisiak | 250/560 |

FOREIGN PATENT DOCUMENTS

| | | | |
|---|---|---|---|
| 931,700 | 3/1948 | France | 356/157 |
| 1,951,089 | 4/1971 | Germany | 250/563 |

Primary Examiner—Paul A. Sacher
Assistant Examiner—Wm. H. Punter
Attorney, Agent, or Firm—S. W. Gremban

[57] ABSTRACT

Apparatus for measuring the length of each of a series of continuously advancing and non-transparent articles, each article possessing an actual length L distributed about a predetermined or nominal length $L_o$. In one embodiment the apparatus comprises two radiation/sensor pairs spaced apart by the nominal length $L_o$. The radiation/sensor pairs are positioned along an axis parallel to the direction of article advancement. One radiation/sensor pair acts as a trigger to indicate when either the leading or trailing edge of the advancing article reaches a predetermined position, at which time the signal developed from the remaining radiation/sensor pair is memorized or recorded. This memorized voltage is an indication of the position of the leading or trailing edge of the advancing articles and thus is a measure of the article's actual length. Disclosed apparatus includes a circuit to compensate for the effects of temperature variations, component drift, etc.

1 Claim, 5 Drawing Figures

LENGTH MEASUREMENT APPARATUS FOR CONTINUOUSLY ADVANCING ARTICLES

BACKGROUND OF THE INVENTION

1. Field of the Invention

The present invention relates to apparatus for measuring the length of each of a series of continuously advancing articles, and more particularly provides such apparatus which is compensated for the effects of temperature variation, component drift, etc.

2. Description of the Prior Art

Various devices for measuring the length or width of moving articles are known in the art. U.S. Pat. No. 3,746,451 discloses a strip width gauge for measuring the width of an advancing strip such as magnetic tape. At each edge of the strip, a light emitting diode is positioned on one side of the strip and a photodiode on the other side of the strip. The amount of light reaching each photodiode depends upon how much light from each light emitting diode is intercepted by the strip. The light output from the photodiodes is added together to provide an indication of strip width. The disclosed strip width gauge is generally not suitable for the measurement of the lengths of advancing articles, nor is any mention made in the patent of how to modify the disclosed strip width gauge to enable the length of an advancing article to be measured.

U.S. Pat. No. 3,365,699 discloses apparatus for the automatic dimensional inspection of a moving object. The patent discloses several embodiments for inspecting the length dimension of a moving object, all of which embodiments are apparently capable of determining whether the moving object has a length within some prescribed tolerance, e.g., 1.000 ± 0.001 inch. None of the embodiments disclosed in the patent are capable of indicating the actual length measurement itself, e.g., 1.0007 inch.

U.S. Pat. No. 3,621,266 relates to apparatus for measuring the lengths of objects being converted with continuously conveying equipment, for example, objects such as steel slabs. The patent specifically relates to the measurement of the length of rectangular slabs when the orientation of the length axis of the slabs varies, from slab to slab, with respect to an axis defined by the direction of conveyance. To this end, disclosed apparatus performs a length measurement (generally larger than the actual length of the slab due to the obliquity of the slab relative to the direction of conveyance) and an angle measurement determinitive of the slab's obliquity. The actual length is then computed from this length and angle measurement. Both the length measurement and the angle measurement are performed by a series of spaced photocells or similar devices. Since each photocell possesses a physical size which limits the "packing density" of the photocells, the length and angle measurement are necessarily discrete measurements. When measuring steel slabs or similar objects wherein the size of the photocell is much smaller than the permissible error of measurement, there is generally no problem. However, when it is desired to perform measurements accurate to within 0.001 inch or less, the method disclosed in the patent appears less attractive.

U.S. Pat. No. 3,761,723 discloses apparatus for measuring dimensional deviations, particularly for measuring edge perforations in cine film. The disclosed apparatus employs rows of optical fibers illuminated by a light source to make such measurements. Basically, the number of fibers which are unobscured from the light source by the perforated film are counted, and knowing the size of each fiber enables the dimensional measurement to be made. Disclosed apparatus employs discrete optical fibers and thus the accuracy of measurement depends upon the size of the individual optical fibers. If it is desired to make relatively accurate measurements, a large number of tiny optical fibers are generally required. Each fiber must then have its own detector and associated circuitry.

It is desirable to make accurate and continuous length measurements of an advancing article without the use of numerous, costly or complex components. Such apparatus should preferably be capable of measuring any length within certain predetermined limits, not merely indicating that the length is within tolerance or out of tolerance. Further, it is desirable to make such length measurements rapidly, thereby enabling articles to be advanced past the apparatus at a rapid rate, as generally preferred in production operations.

SUMMARY OF THE INVENTION

In accordance with the present invention, apparatus is provided for measuring the length of each of a series of continuously advancing articles. Each of the advancing articles possesses an actual length $L$ distributed about a nominal length $L_o$. First sensing means are provided for sensing the position of one of the leading and trailing edges of the advancing article and for generating a first output signal indicative thereof. Second sensing means, separated from the first sensing means by the nominal length $L_o$, sense the position of the other of the leading and trailing edges of the advancing article and generates a second output signal indicative thereof. Trigger means coupled to the first sensing means generates a trigger signal for triggering the second sensing means when one of the leading and trailing edges of the advancing article reaches a predetermined position as determined from the first sensing means. The second output signal from the second sensing means is sampled by a length indicator means, operable in response to the trigger signal. This sample second output signal is indicative of the actual length $L$ of the advancing article.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because general electrical circuits and components are well known, the present description will be directed in particular to elements forming part of, or cooperating more directly with, length measuring apparatus and circuitry in accordance with the present invention. It is to be understood that electrical circuitry or components not specifically shown or described may take various forms well known to those having skill in the art.

Figure 1:
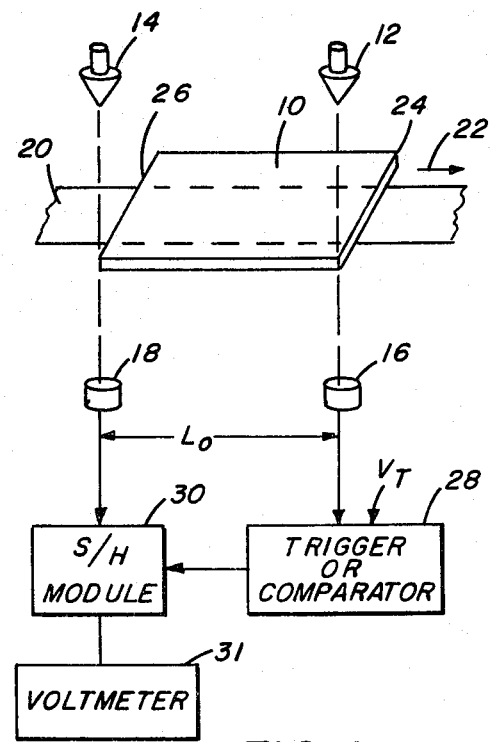
FIG. 1 is a perspective view of a preferred embodiment of the measuring device of this invention.

Referring now to FIG. 1, one concept of the present invention will be described in connection with apparatus for measuring the length of an advancing article 10. A pair of radiating means such as light emitting diodes 12, 14 and their associated sensors such as photosensors 16, 18 respectively, are positioned as shown in FIG. 1. Each light emitting diode (LED) 12, 14 acts as a light source for its corresponding photosensor 16, 18 respectively, forming two LED/photosensor pairs 12, 16, and 14, 18. From each photosensor 16, 18 is developed a voltage which is proportional to the amount of light incident thereon. A conveyor belt 20 continuously advances spaced apart articles 10, only one of which is shown, in the direction of arrow 22. Since article 10 which is non-transparent passes between each LED/photosensor pair 12, 16 and 14, 18, article 10 effectively modulates the light output from the LED's 12, 14 as seen by the photosensors 16, 18. This light modulation is employed in accordance with the invention to determine the length of the continuously advancing article 10.

It is assumed that conveyor belt 20 continuously advances a series of spaced articles, such as article 10, past the LED/photosensor pairs 12, 16 and 14, 18. Each article 10 has an actual length L which generally differs from a predetermined nominal length $L_o$. It is desired to determine the actual length L of each article 10 as it passes between the LED/photosensor pairs 12, 16 and 14, 18. The concept of the present invention thus seeks not merely to accept or reject an article 10 if its length L be within a certain prescribed tolerance, but to provide an actual length measurement for each article 10.

A difficulty arises when attempting to measure the length of a moving article 10 because, due to its motion, there is no constant voltage output from the photosensors 16, 18 which is determinative of the length. The output from the photosensors 16, 18 cannot be directly applied to a voltmeter, or similar device, calibrated in terms of article length (as could be done if measuring the width of an advancing article, see U.S. Pat. No. 3,746,451).

In accordance with the present invention, although either photosensor 16 or 18 can be employed as a triggering device, for the purpose of describing the invention, leading photosensor 16 will be designated the triggering device. As the leading edge 24 of article 10 passes between the LED/photosensor pair 12, 16, the voltage output developed from photosensor 16 falls from a maximum value (before photosensor 16 is obstructed by the leading edge 24 of article 10) to a minimum value (when photosensor 16 is completely obstructed by article 10). At the same time, since the LED/photosensor pairs 12, 16 and 14, 18 are spaced apart by the nominal length $L_o$, the voltage output from photosensor 18 increases from a minimum value (when photosensor 18 is completely obstructed by article 10) to a maximum value (after photosensor 18 is completely uncovered by the trailing edge 26 of article 10).

Figure 2:
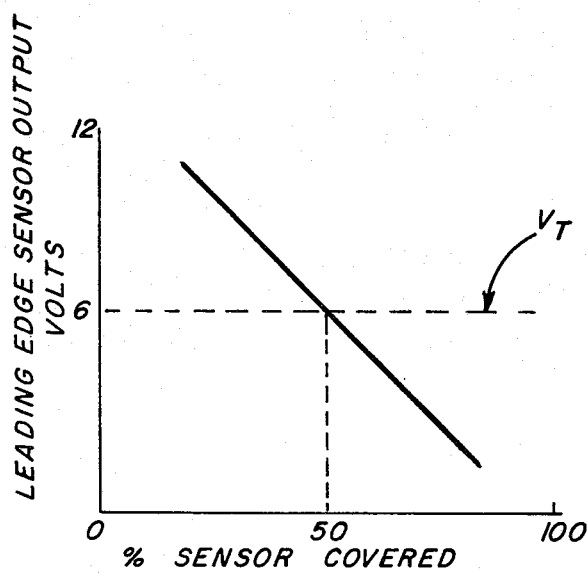
FIGS. 2, 3 and 4 are graphs, supplemental to FIG. 1, which aid in the description of the invention.
Figure 3:
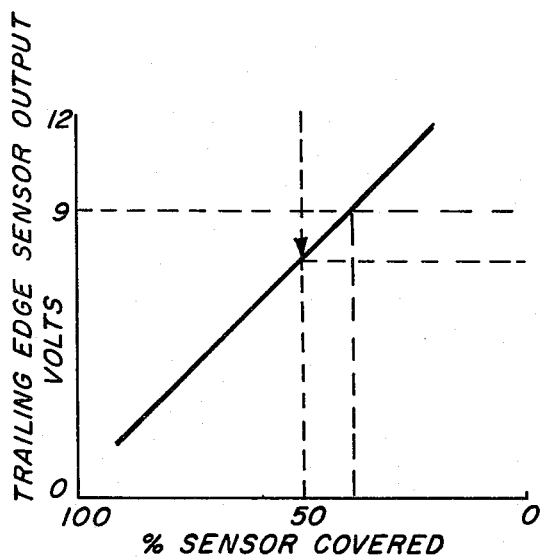

FIGS. 2 and 3 are plots of the voltage outputs of photosensors 16, 18 corresponding to the above description. As shown in FIG. 2, when photosensor 16 is completely unobstructed the voltage developed from sensor 16 is maximum, chosen from example as 12 volts for sake of definiteness. When photosensor 16 is completely obstructed by article 10 the voltage developed from sensor 16 is a minimum value, conveniently taken to be 0 volts. For positions of article 10 whereat the leading edge 24 only partially obstructs photosensor 16, the voltage developed from sensor 16 lies somewhere between 12 and 0 volts depending upon the percentage of sensor area covered. Since the sensor area is circular in this example, the voltage curve would be generally S-shaped with the central portion substantially a straight line as seen in FIGS. 2 and 3, the curved end portions of the voltage curve not being shown. The plot of FIG. 3 relating to the voltage developed from photosensor 18 is similar to FIG. 2 except initially sensor 18 is completely obstructed by article 10 thereby producing the minimum voltage of 0 volts. As trailing edge 26 uncovers sensor 18, the voltage rises until sensor 18 is completely uncovered, corresponding to a maximum voltage of 12 volts.

A fixed trigger threshold voltage $V_T$ (see FIG. 2) midway between 0 and 12 volts is conveniently used to indicate a moment when photosensor 16 is only partially covered (in this example, only one-half covered). Since photosensor 16 is fixed, the voltage $V_T$ represents the same position of leading edge 24 of each article 10 passing between the LED/photosensor pair 12, 16. This voltage $V_T$ is used to indicate the moment when each new article 10 has advanced to the same relative position. Although the voltage $V_T$ has been selected in the example as 6 volts, any other suitable threshold voltage value may be selected. Since the position of the leading edge 24 of the article determines when the threshold voltage is reached, it is highly desirable that the quality of the edge surface be good, not ragged, to achieve accurate length measurement of the article.

Figure 4:
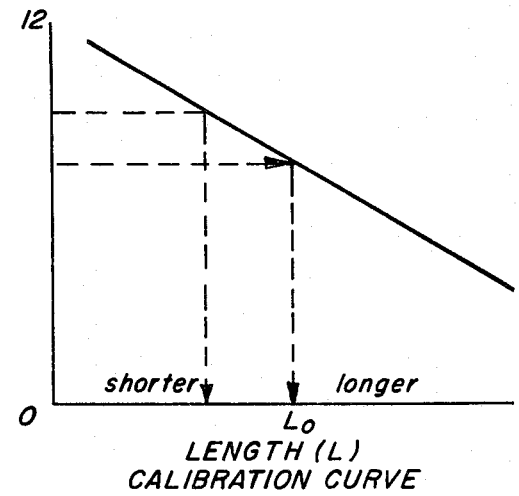

As indicated earlier, the LED/photosensor pairs 12, 16 and 14, 18 are spaced apart by nominal length $L_o$. It is assumed that the absolute actual length L of each article 10 differs from the absolute nominal length $L_o$ by an amount compared to the length of the sensing area of the sensors 16, 18 defined by the formula, e.g. the absolute value of the quantity ($L - L_o$) is less than one half the length of the sensing area of one sensor. Accordingly, when photosensor 16 is only partially covered by article 10, photosensor 18 is only partially covered also. A trigger circuit 28 which may be of any type known to those skilled in the art, is employed to detect when the threshold voltage $V_T$ has been reached by photosensor 16. At this moment, the voltage produced by photosensor 18 is memorized by a sample/hold (S/H) module 30. This memorized voltage level will vary depending upon the amount of photosensor 18 area covered. The amount of sensor area covered is, since leading edge 24 is always in the same position at the time of the memorized voltage, a function of the length of article 10. Therefore, the memorized voltage can be directly applied to a voltmeter 31 or similar device which may have a calibration curve such as shown in FIG. 4 which converts the memorized voltage level to the actual length measurement of article 10.

Thus it is seen that photosensor 16 acts as a trigger to, in effect, "freeze" the motion of article 10 at which time the voltage developed from photosensor 18 is memorized or recorded and which memorized voltage is an indication of the length of the continuously advancing article 10. For example with reference to FIG. 3, if the memorized voltage from photosensor 18 at the time of triggering, for example, is 9 volts, this would indicate an actual length L on the calibration curve (FIG. 4) and meter 31 that is shorter than the nominal length $L_o$. The meter could be calibrated to directly read the length of the article to an accuracy of thousandths of an inch.

Under actual operating conditions the LED's are subject to intensity variations due to temperature, component drift and aging. In addition, the voltage developed from the photosensors may change due to temperature variations of the various components. To automatically compensate for such variations in the voltage reading, which are manifested as errors in the length measurement, another feature of the present invention is a compensation circuit shown in block schematic form in FIG. 5.

Figure 5:
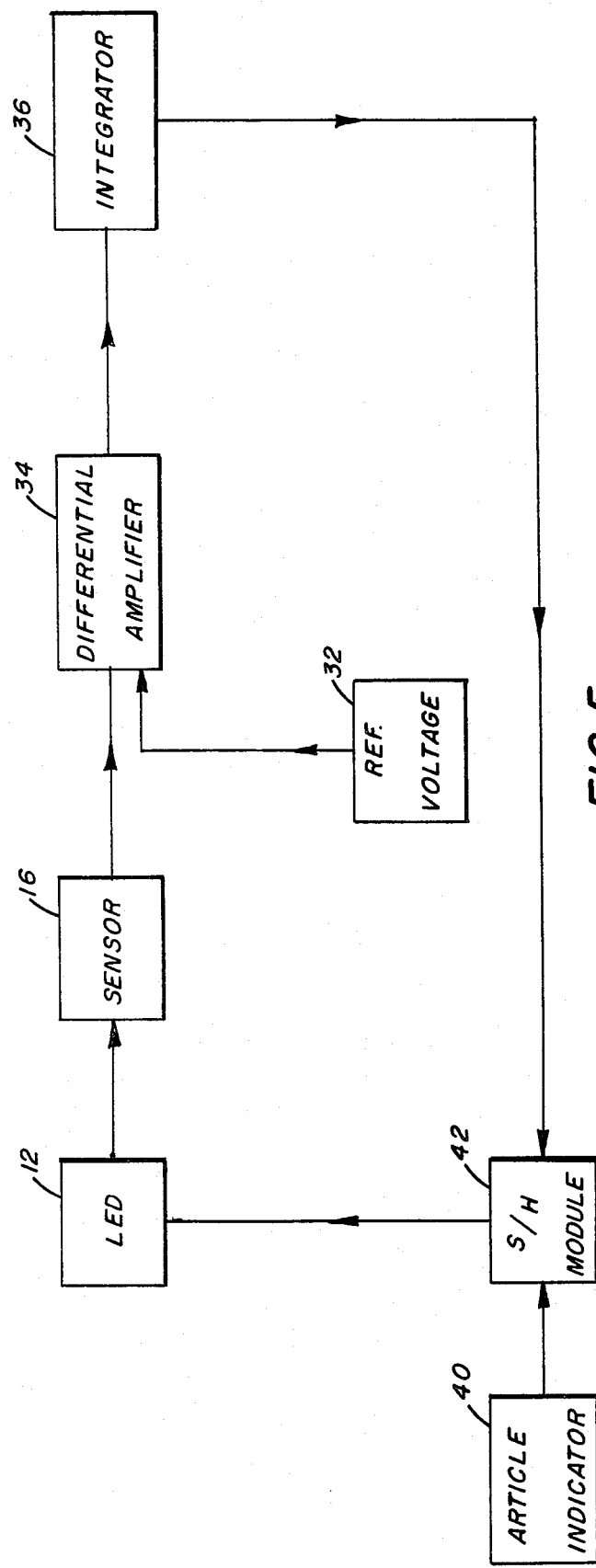
FIG. 5 shows in block schematic form a circuit used to compensate described apparatus for various effects such as temperature variations, component drift, etc.

The circuit shown in FIG. 5 may be adapted to each of the LED/photosensor pairs 12, 16 and 14, 18. Since the operation would be the same in either case, the present description relates to the LED/photosensor pair 12, 16.

The output of sensor 16 is compared with a reference voltage 32 via a differential amplifier 34. The output from differential amplifier 34 is integrated by an integrator 36 to provide a corrective signal indicative of the difference between the voltage of sensor 16 and reference voltage 32. This corrective signal is then applied to LED 12 to adjust the light output in such a manner as to cause the sensor 16 voltage to equal reference voltage 32. As described thus far, the compensation circuit would apply a correction signal to LED 12 whenever the sensor 16 voltage was not equal to the reference voltage 32. The compensation circuit would even attempt to apply a corrective signal to LED 12 to compensate for the normal and expected voltage variations caused by an article 10 as it passes between LED 12 and photosensor 16. It is therefore desirable to employ some means for detecting each advancing article 10 and causing the compensation circuit to ignore the large drop in voltage output from sensor 16 due to the article as it passes between LED 12 and sensor 16.

To this end, an article indicator 40 and a sample/hold (S/H) module 42 are incorporated into the compensation circuit shown in FIG. 5. The article indicator 40 senses when the sensor 16 voltage will be affected by an advancing article and activates S/H module 42. Prior to activation, S/H module 42 permitted the corrective signal from integrator 36 to be applied to LED 12. Upon activation, S/H module 42 "memorizes" the corrective signal then being generated from integrator 36 and causes this "memorized" corrective signal to be applied to LED 12 until S/H module 42 is deactivated. Once article indicator 40 senses that article 10 has passed the LED/photosensor pair 12, 16 and thus will no longer interfere with voltage output from sensor 16, S/H module 42 is deactivated thereby allowing a corrective signal as generated by integrator 36 to be applied to LED 12. This operation continues as each article passes between the LED/photosensor pair.

The invention has been described with reference to preferred embodiments thereof, but it will be understood that variations and modifications can be effected within the spirit and scope of the invention. For example, the threshold voltage $V_T$ does not necessarily have to be halfway between the minimum and maximum voltages developed by the photosensor. Depending upon the application, it may be desirable to choose $V_T$ to have other values between the minimum and maximum voltages. It will also be apparent to those skilled in the art that the choice of a LED/photosensor combination is not unique. Other radiation sources and sensors may be selected within the concept of the present invention, and the sensor areas may be of a configuration other than circular, for example rectangular, square, triangular, etc. The radiation is not restricted to visible light but may include infrared radiation, ultraviolet radiation, Beta source, etc. Also, the radiation/sensor combination could be used in a reflective mode on which the radiation source and sensor are both located in the same side of the article rather than on opposite sides. In addition, instead of having the leading edge of an article and leading radiation/sensor combination in the direction of web travel function as the triggering part of the circuitry, the length measuring apparatus would also function properly if the trailing edge of the article and trailing radiation/sensor combination functioned as the triggering part of the circuitry.

What is claimed is:

1. Apparatus for measuring the length of each of a series of continuously advancing articles, each article possessing an actual length L distributed about a nominal length $L_o$, and each article having a leading edge in the direction of advancement and a trailing edge, said apparatus comprising:

first sensing means for sensing the position of one of said leading and trailing edges of the advancing article and for generating a first output signal indicative thereof;

second sensing means for sensing the position of the other of said leading and trailing edges of the advancing article and generating a second output signal indicative thereof;

trigger means coupled to said first sensing means for generating a trigger signal for triggering said second sensing means when said one of said leading and trailing edges of the advancing article reaches a predetermined position;

length indicator means, operable in response to said trigger signal, for sampling said second output signal when said second sensing means is triggered by said trigger signal, said sampled second output signal being indicative of the actual length L of the advancing article;

said first and second sensing means each comprise a radiation source and a radiation sensor positioned on opposite sides of the advancing article such that as the advancing article passes between said radiation source and said radiation sensor the amount of radiation received by said radiation sensor, and thus the output signal, varies as a function of the sensing area of said radiation sensor which is progressively obstructed from said radiation source by said advancing article;

reference means for generating a reference signal;

comparing means for comparing the output signal of said radiation sensor to said reference signal and generating a control signal indicative thereof;

compensation means, responsive to said control signal, for applying a compensating signal to said radiation source to adjust the level of radiation from said radiation source causing said output signal of said radiation sensor to equal said reference signal; and overriding means for overriding said control signal when the advancing article obstructs said radiation sensor and for holding the radiation output level of said radiation source to the level of radiation generated just prior to obstruction of said radiation sensor by the advancing article.

* * * * *